United States Patent
Turley et al.

(10) Patent No.: US 7,983,548 B2
(45) Date of Patent: Jul. 19, 2011

(54) SYSTEMS AND METHODS OF GENERATING Z-BUFFERS IN CAMERAS

(75) Inventors: Richard Turley, Fort Collins, CO (US); David Branson, Fort Collins, CO (US); Andrew C. Goris, Loveland, CO (US); David R. Lawson, Greeley, CO (US); Donald J. Stavely, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1371 days.

(21) Appl. No.: 11/261,109

(22) Filed: Oct. 28, 2005

(65) Prior Publication Data
US 2007/0098387 A1   May 3, 2007

(51) Int. Cl.
*G03B 15/03* (2006.01)
(52) U.S. Cl. .......................................... 396/109
(58) Field of Classification Search ................ 396/109
See application file for complete search history.

(56) References Cited

U.S. PATENT DOCUMENTS

| | | | |
|---|---|---|---|
| 3,619,058 A | 11/1971 | Hewlett et al. | |
| 4,521,107 A | 6/1985 | Chaborski et al. | |
| 5,680,648 A * | 10/1997 | Nonaka | 396/109 |
| 6,288,775 B1 | 9/2001 | Tanaka | |
| 6,441,818 B1 | 8/2002 | Kurose | |
| 6,630,931 B1 | 10/2003 | Trika et al. | |
| 6,690,369 B1 | 2/2004 | Smith, Jr. et al. | |
| 6,829,043 B2 | 12/2004 | Lewis et al. | |
| 6,856,355 B1 * | 2/2005 | Ray et al. | 396/106 |
| 6,882,342 B2 | 4/2005 | Suzuki et al. | |
| 7,268,341 B2 * | 9/2007 | Lehoty et al. | 250/221 |

OTHER PUBLICATIONS

Thompson, Laird, "Creating and Detecting Rayleigh Laser Guide Stars", Center for Adaptive Optics Newletter, Design Copyright 2002 University of California Regents.
Turk, Matthew A., et al., "VITS—A Vision Systems for Autonomous Land Vehicle Navigation", IEEE Transactions on Pattern Analysis and Machine Intelligence, vol. 10, No. 3, May 1988.

* cited by examiner

*Primary Examiner* — Clayton E LaBalle
*Assistant Examiner* — Autumn Parker

(57) ABSTRACT

Systems and methods for implementing Z-buffer generation in a camera are disclosed. In an exemplary embodiment the method may comprise actuating a light sensor after various delays to receive a plurality of modulated light signals reflected from different regions of a scene adjacent a camera. The method may also include determining distance information for the different regions of the scene based on brightness values for the plurality of modulated light signals reflected from the scene for the various delays. The method may also include storing the distance information in a Z-buffer at the camera.

23 Claims, 6 Drawing Sheets

US 7,983,548 B2

SYSTEMS AND METHODS OF GENERATING Z-BUFFERS IN CAMERAS

RELATED APPLICATION

This application is related to co-owned U.S. Patent Application for "Systems and Methods of Generating Z-Buffers for an Image Capture Device of a Camera" of Turley, et al. U.S. patent application Ser. No. 11/261,276, filed on the same date.

TECHNICAL FIELD

The described subject matter relates to cameras in general, and more particularly to systems and methods of generating Z-buffers in cameras.

BACKGROUND

Conventional film, and more recently, digital cameras are widely commercially available. Cameras range both in price and in operation from sophisticated single lens reflex (SLR) cameras used by professional photographers to inexpensive "point-and-shoot" cameras that nearly anyone can use with relative ease. However, all of these cameras operate with little, if any, information about the Z-axis (i.e., the distance from the camera to objects regions of the scene being photographed).

Some digital cameras repeatedly take images of relatively small, predefined regions of the overall scene being photographed to estimate a distance to a particular object in the predefined region for focusing the lens to that object. However, no distance information is obtained for other regions of the scene being photographed. Typically a focus number (e.g., 1 bit) representing the final lens position is stored with a low resolution focus image that can only be used for focusing the camera. In addition, any information which was gathered is used to focus the camera and is then discarded.

SUMMARY

An exemplary embodiment of Z-buffer generation may be implemented in a system. The system may comprise a light source generating a plurality of modulated light signals at the camera, each of the plurality of modulated light signals having a different correlation code. A single-element light sensor may receive the plurality of modulated light signals generated at the camera after the modulated light signals are reflected from different regions of a scene adjacent the camera. A processor may be operatively associated with the single-element light sensor, the processor determining distance information for the different regions of the scene based on the plurality of modulated light signals reflected from the scene for generating a Z-buffer.

In another exemplary embodiment, Z-buffer generation may be implemented as a method, comprising: actuating a light sensor after various delays to receive a plurality of modulated light signals reflected from different regions of a scene adjacent a camera, determining distance information for the different regions of the scene based on brightness values for the plurality of modulated light signals reflected from the scene for the various delays, and storing the distance information in a Z-buffer at the camera.

DETAILED DESCRIPTION

Briefly, light emitted at a camera and reflected from objects in a scene adjacent the camera may be used to determine information about the Z-axis (or "distance information") for objects in the scene. This distance information may be stored in a Z-buffer for the camera.

Distance information stored in the Z-buffer may be used before image capture for use by the camera, e.g., to control lens focus. Distance information stored in the Z-buffer may also be used after image capture for rendering (e.g., adjusting brightness, color, sharpness), editing purposes (e.g., adding or removing layers of the image), and/or for special effects (e.g., blurring foreground/background elements), to name only a few examples.

Exemplary System

Figure 1:
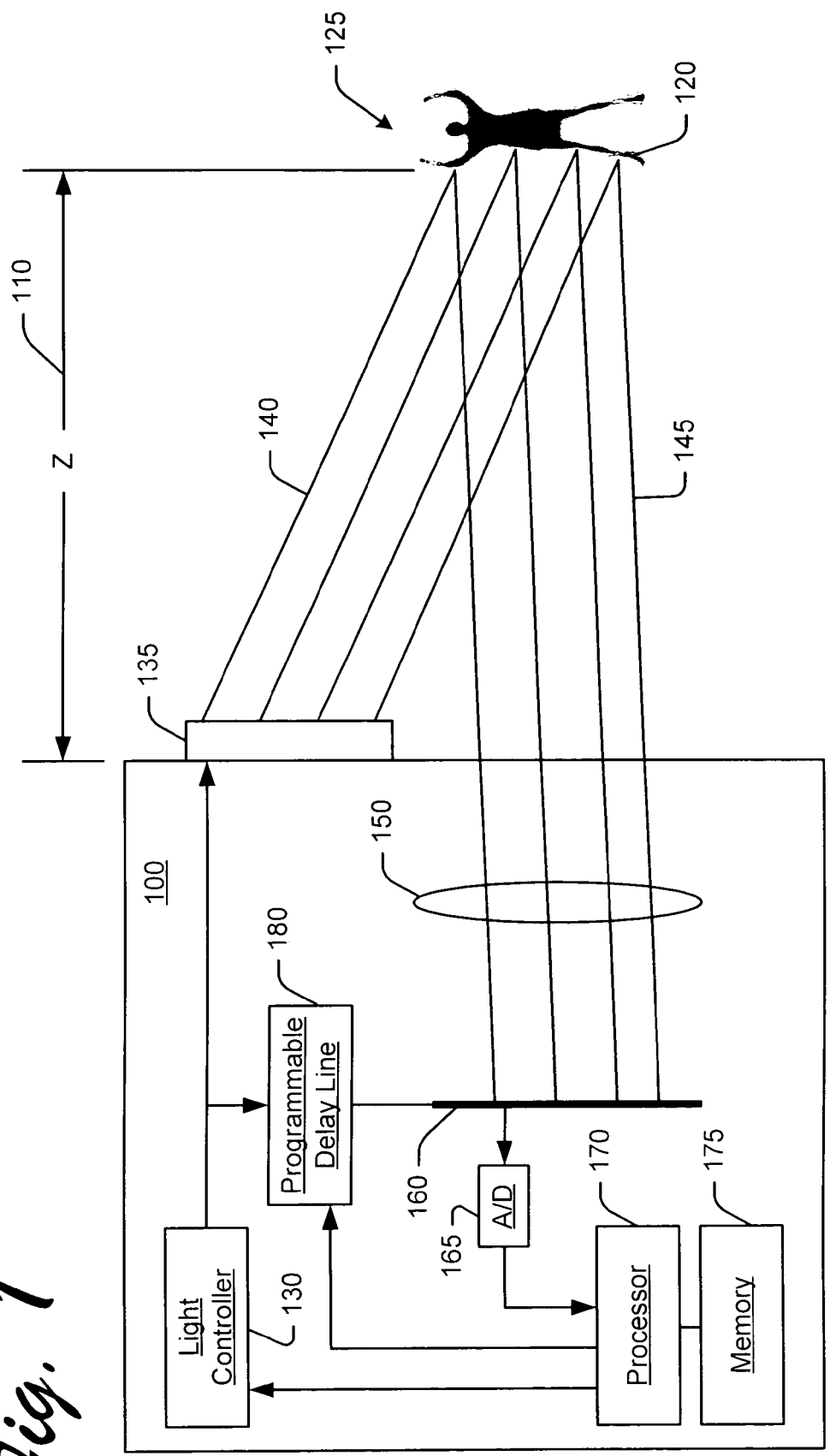
FIG. 1 is a high-level diagram of an exemplary camera system which may be implemented for generating Z-buffers.

FIG. 1 is a high-level diagram of an exemplary camera system 100 which may be implemented for Z-buffer generation. Camera systems include both digital and film cameras now known or that may be later developed. Exemplary camera system 100 may be provided with circuitry for determining the distance 110 of the camera system 100 from one or more objects 120 in a scene 125 adjacent the camera system 100.

In an exemplary embodiment, the circuitry includes a light controller 130 operatively associated with a light source 135. The light controller 130 may be implemented as a signal generator capable of generating one or more waveforms for emission by the light source 135. For example, light controller 130 may generate a single waveform and cycle the waveform for emission at different times. Alternatively, light controller 130 may generate different waveforms, e.g., each having a different correlation code for simultaneous emission by separate lights at the light source 135. Exemplary waveforms are described in more detail below with reference to FIG. 3.

The light source 135 may be implemented using any suitable lights, such as, e.g., light emitting diodes (LEDs), laser, etc., which emit visible or invisible light (e.g., infrared or IR light) and can be modulated at high frequencies directly or indirectly. For example, an LED may have a high-speed optical modulator for indirect modulation. The light source 135 is capable of targeting emitted light 140 on different regions in the scene 125. For example, the light source 135 may be implemented as an array of lights, or a pattern of lights. Exemplary light sources are described in more detail below with reference to FIG. 2.

Exemplary camera system 100 may also include a lens 150 positioned in the camera system 100 to focus reflected light 145 from the scene 125 onto a light sensor 160. Exemplary lens 150 may be any suitable lens which focuses light reflected from the scene 125 onto light sensor 160.

Exemplary light sensor 160 may be implemented as a single-element, high-speed light sensor, such as, e.g., a photodiode, broad field sensor, etc. The light sensor includes one or more photosensitive cell which builds-up or accumulates an electrical charge in response to exposure to light (e.g., photons). The accumulated electrical charge in any given cell is proportional to the intensity and duration of the light exposure.

In an exemplary embodiment, light sensor 160 is provided separate and apart from an image capture device (not shown) for capturing an image of the scene 125. Accordingly, distance information may be determined without interfering with image capture operations (e.g., focusing).

Exemplary camera system 100 may also include a processor 170 for determining the distance 110 to one or more objects 120 in the scene 120 based on the reflected light 145 received at the camera system 100. In an exemplary embodiment, the light controller 130 is operatively associated with the light controller 130, light sensor 160 via an analog-to-digital (A/D) converter 165, and a programmable delay line 180.

Delay lines are well understood in the electronics arts. An exemplary analog delay line may be implemented as a low-pass filter including inductors and shunt capacitors which delay the input signal by a specified time (or phase shift). Alternatively, a digital delay line may be implemented as a shift register with programmable length. A programmable delay line may be implemented to vary the delay for different cycles, as discussed in more detail below. It is noted, however, that delay line 180 is not limited to any particular implementation.

During operation, the processor 170 actuates the light controller 130 to emit one or more modulated light signals. The processor may also signal the programmable delay line 180 to actuate the light sensor 160 after a predetermined (or estimated) delay. The output of the delay line controls the gain or sensitivity of the sensor at high speed as the light 145 is received. There are other ways of accomplishing demodulation (or detection) of the light signal. For example, instead of having the output of delay line 180 control the gain of light sensor 160 directly, the output may instead control a light shutter in front of the light sensor 160. The light shutter 152 may be implemented as an LCD or Pockels cell. The modulated light signal is emitted by light source 135 (e.g., as light 140) and reflected from one or more region in the scene 125 (e.g., as light 145). The light sensor 160 is actuated (e.g., by the processor 170 via programmable delay line 180) to receive the reflected light signal 145. The light signal accumulated at the light sensor 160 is integrated and input to the processor 170, e.g., as a brightness value.

During operation, the light controller 130 may cause the light source 135 to continuously cycle through a modulation code, thereby emitting light 140 according to the waveform generated by the light controller 130, e.g., every 1/60th of a second for several seconds. The estimated delay introduced by the delay line is varied (e.g., increased or decreased) for each cycle. Accordingly, the processor 170 receives a brightness value for each cycle.

The processor 170 compares the brightness values, e.g., as discussed in more detail below with reference to FIGS. 3 and 4. The most intense brightness value corresponds to the programmable delay value that most closely matches the actual flight time of the light (e.g., light signal 140 and 145). The processor 170 then uses the time (e.g., programmed at the delay line 180) for the waveform which has the "best fit" to calculate the distance 110 to an object 120 in the scene 125, e.g., using calculations based on the speed of light.

The light controller 130 also causes the light source 135 to continuously cycle through the modulation code for different regions of the scene 120. For example, the light controller 130 may activate different lights in a light array or light pattern at the light source 135 (see, e.g., FIGS. 2a and 2b) with each light signal having a different correlation code. Or for example, different lights in the light source 135 may be activated at different times. In any event, the processor 170 compares the signals for each region of the scene 125 to calculate the distance to objects in different regions of the scene 125.

Accordingly, the processor 170 is able to determine the distance corresponding to different pixels on the image capture device (not shown) even though the light sensor 160 may be provided separate and apart from the image capture device for the camera system 100, and/or the light sensor 160 may be implemented as a single-element sensor. For example, processor 170 may associate the distance determined for reflected light from different lights in the light source 135 with predetermined pixels on the image capture device for the camera system 100.

Processor 170 may also be operatively associated with memory 175 for storing the distance information for objects in different regions of the scene 125. In an exemplary embodiment, the distance information is stored in a Z-buffer, such as, e.g., the Z-buffer discussed in more detail below with reference to FIG. 5. The Z-buffer and/or data from the Z-buffer may also be stored as a removable memory or as a downloadable file, e.g., in JPEG format.

Figure 2A:
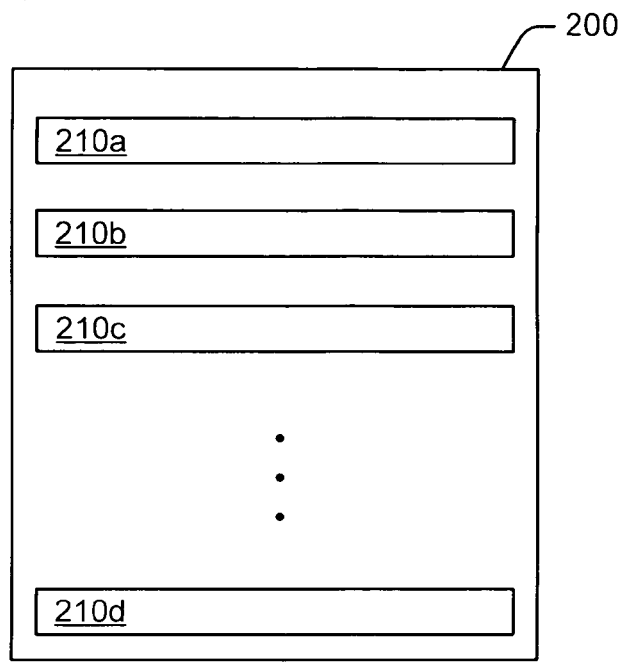
FIGS. 2a and 2b are illustrations of exemplary light sources which may be implemented by the camera system in FIG. 1.
Figure 2B:
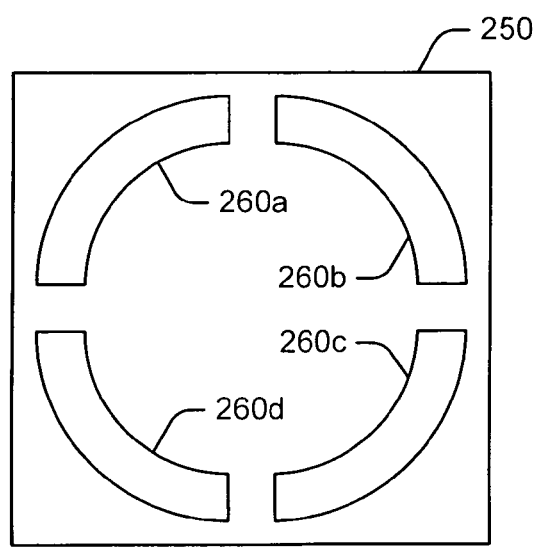

FIGS. 2a and 2b are illustrations of exemplary light sources (e.g., the light source 135 shown in FIG. 1). An exemplary light source is shown in FIG. 2a implemented as a light array 200 including a plurality of lights 210a-d. The lights 210a-d are shown substantially rectangular in shape and arranged adjacent one another. It is noted, however, that light array 200 is not limited to any particular number or shape of lights 210a-d.

Another exemplary light source is shown in FIG. 2b implemented as a light pattern 250 including a plurality of lights 260a-d. The lights 260a-d are shown as annular segments and arranged to form a ring. Again however, it is noted that light pattern 250 is not limited to any particular number or shape of lights 260a-d.

During operation, a light source (e.g., light array 200 or light pattern 250) may be activated so that all of the lights emit light simultaneously. For example, the light array 200 (or light pattern 250) may be activated so that all of the lights 210a-d (or lights 260a-d) emit light simultaneously and are then shut off at substantially the same time. According to such an embodiment, each light signal may have a different correlation code. Generating light signals with different correlation codes is well-understood in the electronics arts and further discussion is not necessary for a full understanding of the systems and methods disclosed herein.

Alternatively, a light source (e.g., light array 200 or light pattern 250) may be activated so that one or more of the lights emit light sequentially (i.e., at different times). By way of example, the light array 200 (or light pattern 250) may be operated such that light 210a (or light 260a) is turned on and off, then light 210a (or light 260b) is turned on and off, and so forth. In another example, lights 210a and 210b (or lights 260a and 260b) may be turned on and off together, then lights 210c and 210d (or 260c and 260d) may be turned on and off together.

It is noted that the light sources (e.g., light array 200 and light pattern 250) may also be activated randomly. In addition, the light sources may be operated cyclically, as discussed above with reference to FIG. 1. It is also noted that the light sources are not limited to light array 200 and light pattern 250.

Figure 3:
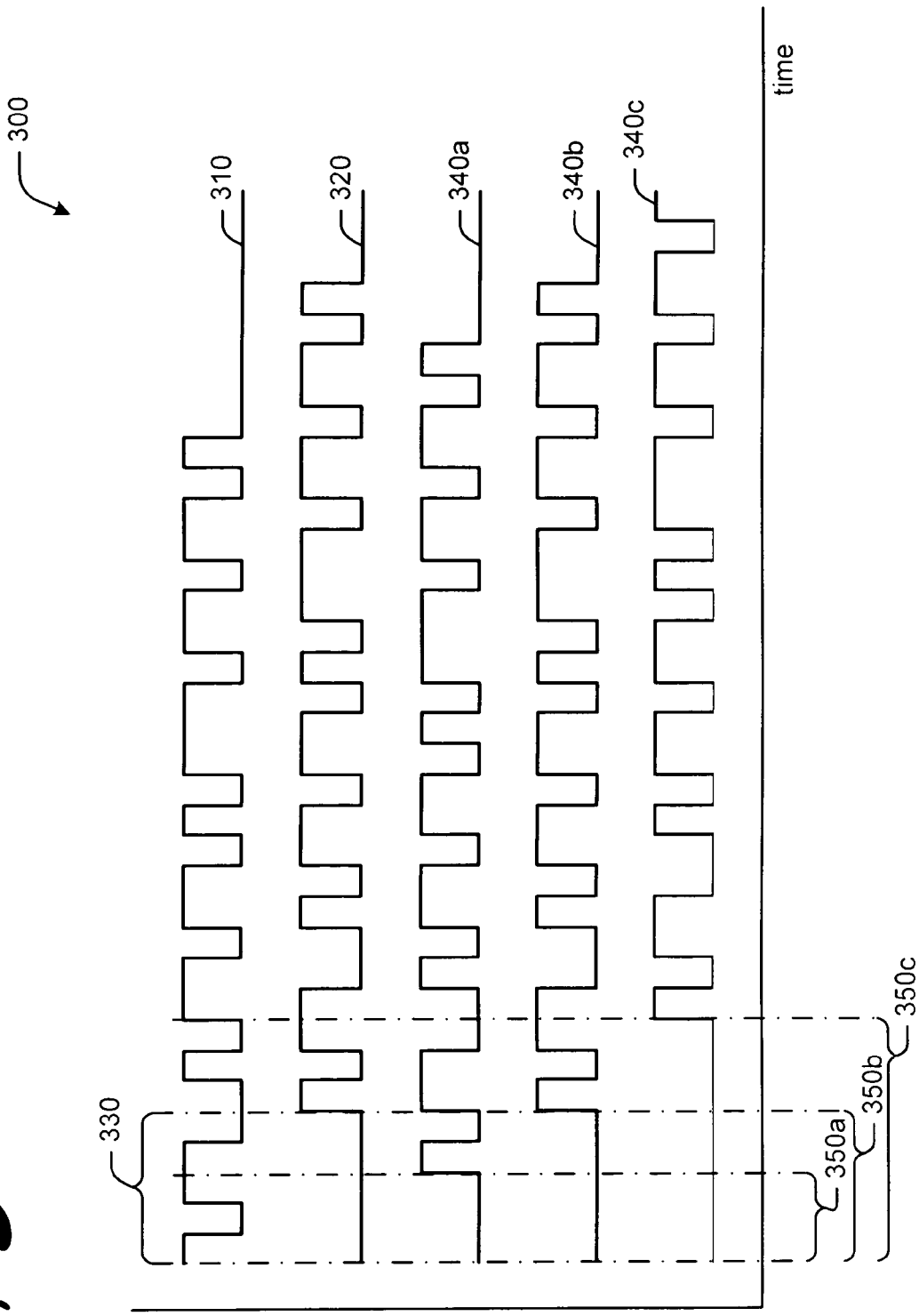
FIG. 3 is a waveform diagram illustrating exemplary waveforms of light signals for generating Z-buffers.

FIG. 3 is a waveform diagram 300 illustrating exemplary waveforms for light signals. Waveform 310 illustrates an exemplary light signal which may be emitted by a light source at a camera (e.g., light source 130 for the camera system 100 shown in FIG. 1). Waveform 320 illustrates an exemplary light signal which may be received at the camera after the light is reflected from a scene adjacent the camera (e.g., at light sensor 160 in FIG. 1).

In an exemplary embodiment, the waveforms may be implemented as pseudo-noise (P-N) codes. The behavior of P-N codes is well-understood in the electronics arts and therefore can readily be implemented with well-known autocorrelation functions. However, it is noted that the waveforms may be any digital or analog signal with autocorrelation properties that allow synchronization of the sent and received versions of the waveform.

Although any suitable waveform(s) may be used, complex waveforms may be implemented to reduce the effects of interference from other signals, ambient light, and/or other noise. It is also noted that the waveforms may have any suitable period. In exemplary embodiments, the period may be of sufficient length (e.g., based on estimate flight times) so as to reduce the effects of phase shift on distance calculations (also known as "aliasing").

In any event, the flight time 330 (i.e., the time it takes the transmitted light signal 320 to reach an object in the scene and be reflected to the light sensor) may be used to determine distance to objects in the scene as follows. In an exemplary embodiment, the actual flight time 330 may be determined by actuating the light sensor and measuring brightness values after known delays (e.g., by actuating the light sensor 160 using programmable delay line 180 in FIG. 1). For purposes of illustration, waveform 340a illustrates actuation of the light sensor after a first delay 350a during a first cycle, waveform 340b illustrates actuation of the light sensor after a second delay 350b during a second cycle, and waveform 340c illustrates actuation of the light sensor after a second delay 350c during a third cycle. The light accumulated at the light sensor during an accumulation window may be integrated to determine an overall brightness value for each cycle.

Figure 4:
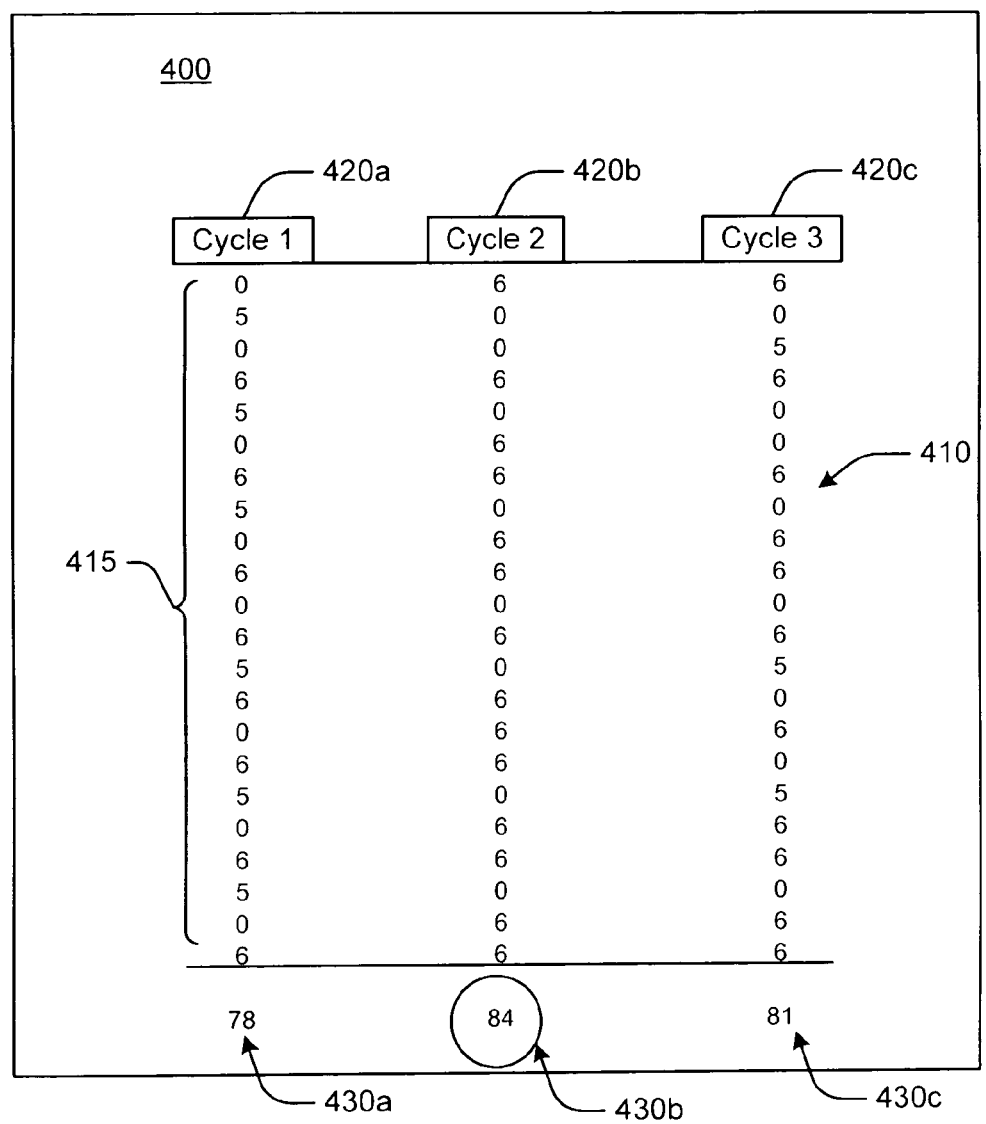
FIG. 4 is a table illustrating exemplary light accumulation for three cycles corresponding to different delays for actuating the light sensor.

FIG. 4 is a table 400 illustrating exemplary light accumulation 410 for three cycles 420a-c corresponding to different delays for actuating the light sensor (e.g., waveforms 340a-c in FIG. 3) to determine overall brightness values 430a-c. In an exemplary embodiment, light accumulation values 410 may be the number of photons received at the light sensor during accumulation window 415. Corresponding brightness values 430a-c are also Shown for each cycle 420a-c, respectively (e.g., as the summation of the light accumulation during accumulation window 415).

Brightness values 430a-c may be obtained using autocorrelation functions well-understood in the electronics arts. In an exemplary embodiment, pseudo-noise modulation of the transmitted light may be implemented. The autocorrelation function of pseudo-noise modulation results in a readily detected peak, yielding superior phase locking between the transmitted and reflected light. It is noted, however, that any correlation function may be implemented and is not limited to use with pseudo-noise modulation.

A processor may then be implemented to compare the brightness values 430a-c for each cycle 420a-c to arrive at the actual flight time. The actual flight time may then be used to determine distance information for an object in the scene. For purposes of illustration, the brightness value 430b for the second cycle 420b shows the highest correlation (or "best fit") between the reflected light and actuation of the light sensor (e.g., waveforms 320 and 340b in FIG. 3). Accordingly, the delay used to actuate the light sensor during the second cycle (e.g., delay 350b in FIG. 3) corresponds to the actual flight time and may be used by the processor to determine distance information for an object in the scene, e.g., using calculations based on the speed of light.

It is also noted that the effects of noise may be reduced using well-known noise reduction techniques. One such noise-reduction technique includes measuring and subtracting ambient light from the signal strength. The effects of noise may also be reduced after the distance information is stored in a Z-buffer, as discussed in more detail below with reference to FIG. 5.

Figure 5:
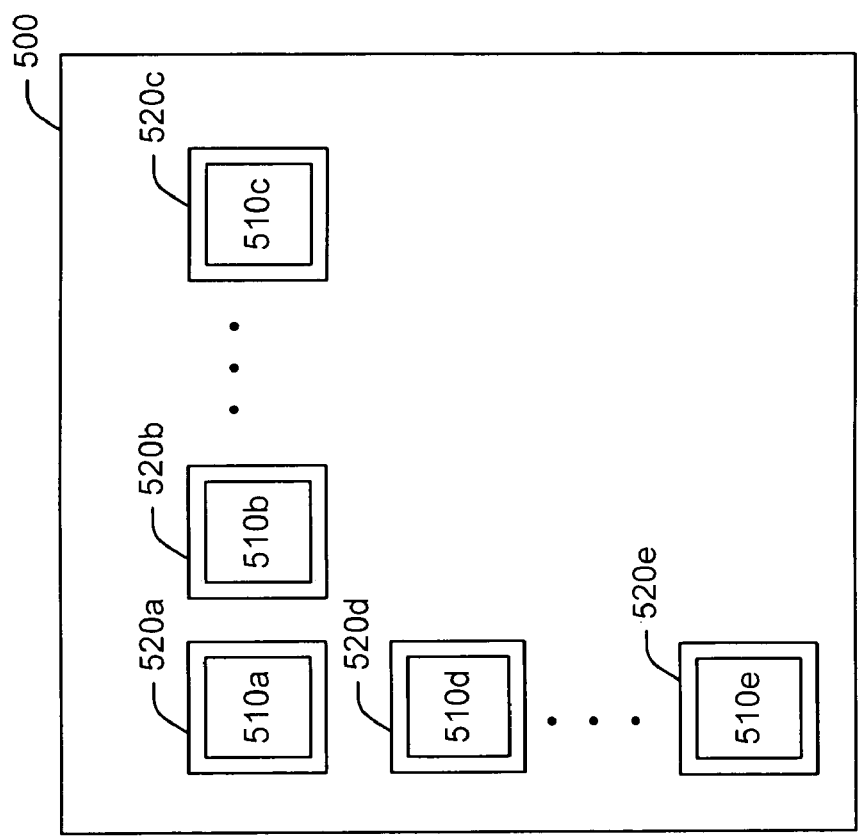
FIG. 5 is a diagrammatic illustration of an exemplary Z-buffer.

FIG. 5 is a diagrammatic illustration of an exemplary Z-buffer 500. The term "Z-buffer" as used herein is an area in memory (e.g., a data structure) reserved for storing distance information corresponding to regions of the image capture device in a camera. Exemplary Z-buffer 500 includes distance information 510a-e (e.g., Z-axis or distance values to objects in the scene) corresponding to regions 520a-e of the image. Distance information may be determined for each region as discussed above by emitting light from multiple lights (e.g., in a light array or light pattern).

Regions 520a-e may be defined according to any suitable criteria. For example, regions 520a-e may be defined as individual pixels or groups of pixels on the focal plane or image capture device of the camera. It is noted that Z-buffer 500 may include any number of regions, limited only by practical considerations, such as, e.g., desired granularity, file size, processing speed, and the ability to effectively determine distance information for each region.

In exemplary embodiments, data management techniques may be implemented to increase processing speeds and reduce file size for the Z-buffer 500, thereby enabling the Z-buffer 500 to be more readily stored, accessed, and manipulated within the memory constraints of the camera system. For example, the distance information 510a-e may be compressed using conventional data compression techniques to reduce the file size.

In addition, distance information may be stored in the Z-buffer 500 using a non-linear format (e.g., as 1/Z or as log Z, where Z is the distance information). Although storing distance information in a non-linear format may reduce the precision of distance measurements farther from the camera, greater precision may be maintained for distance measurements closer to the camera. Such a technique may be implemented if distinguishing between distances close to the camera (e.g., between 3 feet and 4 feet) is more important to the user than distinguishing between distances farther from the camera (e.g., between 103 feet and 104 feet).

The Z-buffer 500 may be further processed to correct distance information 510a-e that has already been stored, e.g., to reduce the effects of noise on distance measurements. In an exemplary embodiment, the Z-buffer may be processed using spatial filtering techniques. By way of illustration, distance information for one or more regions (e.g., distance information 510a in region 520a) may be compared to distance information for adjacent regions (e.g., distance information 510b and 510d) and "corrected" if it is outside predetermined boundaries. For example, distance information may be deleted or modified based on distance information for adjacent regions, e.g., by averaging.

In any event, Z-buffer 500 may be implemented by the camera and/or the user for any of a wide variety of different functions. For example, distance information stored in the Z-buffer 500 may be used to control lens focus and other effects (e.g., blurring foreground and/or background elements), to name only a few examples. Distance information stored in the Z-buffer 500 may also be associated with the image file (e.g., as meta data), and downloaded to a computing device for use with photo-editing or other graphics software for editing the image (e.g., based on image layers).

It is noted that the exemplary embodiments discussed above are provided for purposes of illustration. Still other embodiments are also contemplated.

Exemplary Operations

Figure 6:
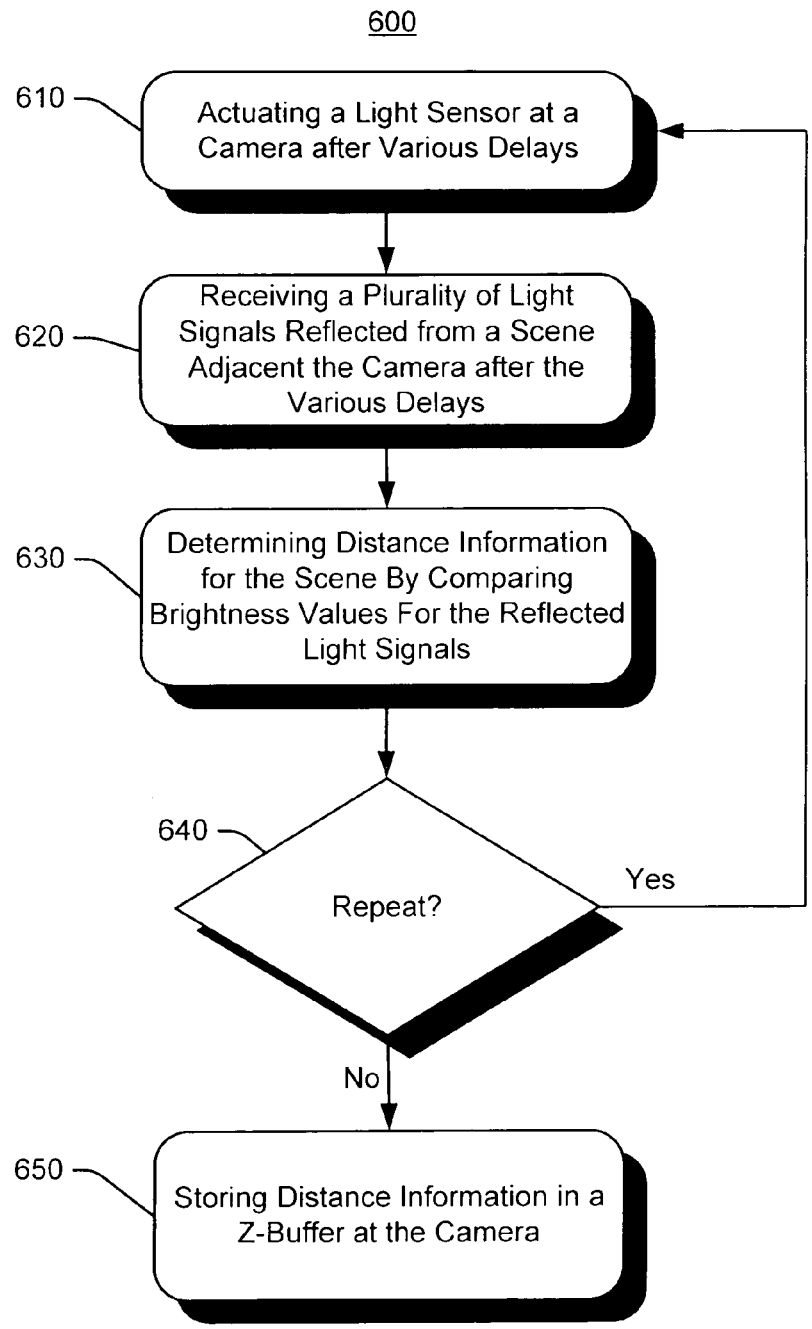
FIG. 6 is a flowchart illustrating exemplary operations which may be implemented for generating Z-buffers.

FIG. 6 is a flowchart illustrating exemplary operations to implement Z-buffer generation in a camera. Operations 600 may be embodied as logic instructions on one or more computer-readable medium in the camera. When executed on a processor at the camera, the logic instructions implement the described operations. In an exemplary embodiment, the components and connections depicted in the figures may be used to generate Z-buffers for cameras.

In operation 610, a light sensor is actuated after various delays. In operation 620, a plurality of modulated light signals reflected from different regions of a scene adjacent a camera may be received by the light sensor. In operation 630, distance information is determined for at least one object in the scene based on a comparison of the brightness values for the modulated light signal reflected from the scene.

In operation 640, a decision is made whether to repeat the operations, e.g., for all distance values of interest. For example, operations 610-630 may be repeated for another light in a light array or light pattern if the lights are being activated sequentially. Or for example, operations 610-630 may be repeated until a best fit correlation between the reflected light signal and the delayed copy is determined. In operation 650 the distance information may be stored in a Z-buffer at the camera.

It is noted that the operations described above may be executed at any time during operation of the camera to generate a Z-buffer. For example, operations for distance measurements may be implemented prior to image capture and used, e.g., for focusing the camera on a scene, exposure compensation, etc. Or for example, distance measurements may be implemented following image capture so the measurements do not introduce a delay before the camera is able to capture the image. In still another embodiment, operations for distance measurements may occur simultaneously with operations for image capture.

The operations shown and described herein are provided to illustrate exemplary embodiments of Z-buffer generation in a camera. It is noted that the operations are not limited to the ordering shown. For example, distance information may be stored in the Z-buffer (operation 650) before a decision is made to repeat operations (operation 640). Other operations (not shown) may also be executed to enable Z-buffer generation. For example, operations may be implemented to reduce the effects of noise. Or for example, operations may be implemented to enhance distance determinations made in low-light conditions. Still other operations (not shown) may be executed to use distance information stored in the Z-buffer. For example, the distance information may be associated with a file for editing an image captured by the camera at the camera or on a computing device (e.g., using image editing software).

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A system for Z-buffer generation in a camera, comprising:
    a light source generating a plurality of modulated light signals at the camera, the light source configured to generate each of the plurality of modulated light signals having a different correlation code to uniquely identify individual light signals;
    a single-element light sensor receiving tile plurality of modulated light signals generated at tile camera after the modulated light signals are reflected from different regions of a scene adjacent the camera; and
    a processor operatively associated with the single-element light sensor, the processor identifying the light signals using the correlation codes and determining distance information for the different regions of the scene based on the plurality of modulated light signals reflected from the scene for generating a Z-buffer configured to store distance information using a non-linear format.

2. The system of claim 1 further comprising computer-readable memory operatively associated with the processor, the computer-readable memory including the Z-buffer for storing the distance information at the camera.

3. The system of claim 1 wherein the light source is configured to generate the plurality of modulated light signals each having the different correlation code for a corresponding autocorrelation function executable by the processor.

4. The system of claim 1 wherein the light source is configured to generate the plurality of modulated light signals each having different P-N correlation codes.

5. The system of claim 1 further comprising a programmable delay line, the programmable delay line actuating the single-element light sensor after various delays.

6. The system of claim 5 wherein the processor includes program code for comparing a brightness value for each of the plurality of modulated light signals received at the single-element light sensor to determine the distance information.

7. The system of claim 6 wherein the program code executes an autocorrelation function for pseudo-noise modulation.

8. The system of claim 1 further comprising a light controller generating the plurality of modulated light signals at the camera, wherein the light source emits the plurality of modulated light signals generated by the light controller.

9. The system of claim 8 wherein the light source is a plurality of sources arranged in an array or pattern.

10. The system of claim 8 wherein the light source includes a plurality of lights, each of the lights emitting different modulated light signals for the different regions of the scene simultaneously.

11. The system of claim 8 wherein the light source includes a plurality of lights configured to emit modulated light signals for the different regions of the scene sequentially.

12. The system of claim 1 wherein the processor executes program code to modify the distance information based on distance information stored in the Z-buffer to reduce noise effects on the distance information.

13. A method comprising:
    actuating a light sensor after various delays to receive a plurality of modulated light signals reflected from different regions of a scene adjacent a camera;
    determining distance information for the different regions of the scene based on brightness values for the plurality of modulated light signals reflected from the scene for the various delays; and
    storing the distance information in a Z-buffer at the camera.

14. The method of claim 13 wherein each of the plurality of modulated light signals has a different correlation code.

15. The method of claim 13 wherein each of the plurality of modulated light signals has a same correlation code and is emitted at different times for different regions of the scene.

16. The method of claim 13 further comprising:
generating the plurality of modulated light signals at the camera; and
emitting the plurality of modulated light signals onto the different regions of the scene.

17. The method of claim 13 further comprising simultaneously emitting the plurality of modulated light signals onto the different regions of the scene.

18. The method of claim 13 further comprising sequentially emitting a plurality of modulated light signals onto the different regions of the scene.

19. The method of claim 13 further comprising reducing noise effects on the distance determination.

20. The method of claim 13 further comprising determining the distance information before image capture for focusing and exposure compensation.

21. The method of claim 13 further comprising determining the distance information after image capture to prevent delay during image capture.

22. The method of claim 13 wherein storing the distance information in the Z-buffer is in non-linear format.

23. A system for Z-buffer generation in a camera, comprising:
a light source generating a plurality of modulated light signals at the camera, the light source configured to generate each of the plurality of modulated light signals having a different correlation code to uniquely identify individual light signals;
a single-element light sensor receiving the plurality of modulated light signals generated at the camera after the modulated light signals are reflected from different regions of a scene adjacent the camera;
a processor operatively associated with the single-element light sensor, the processor identifying the light signals using the correlation codes and determining distance information for the different regions of the scene based on the plurality of modulated light signals reflected from the scene for generating a Z-buffer; and
wherein the processor executes program code to modify the distance information based on distance information stored in the Z-buffer to reduce noise effects on the distance information.

\* \* \* \* \*

UNITED STATES PATENT AND TRADEMARK OFFICE
CERTIFICATE OF CORRECTION

| | | |
|---|---|---|
| PATENT NO. | : 7,983,548 B2 | Page 1 of 1 |
| APPLICATION NO. | : 11/261109 | |
| DATED | : July 19, 2011 | |
| INVENTOR(S) | : Richard Turley et al. | |

It is certified that error appears in the above-identified patent and that said Letters Patent is hereby corrected as shown below:

In column 8, line 6, in Claim 1, delete "tile" and insert -- the --, therefor.

In column 8, line 7, in Claim 1, delete "tile" and insert -- the --, therefor.

Signed and Sealed this
Third Day of April, 2012

David J. Kappos
*Director of the United States Patent and Trademark Office*